(12) United States Patent
Arndt et al.

(10) Patent No.: US 6,507,640 B1
(45) Date of Patent: Jan. 14, 2003

(54) X-RAY BEAM POSITION MONITORS

(75) Inventors: Ulrich Wolfgang Arndt, Cambridge (GB); Martin Paul Kyte, Isleham (GB)

(73) Assignee: Medical Research Council, London (GB)

( * ) Notice: Subject to any disclaimer, the term of this patent is extended or adjusted under 35 U.S.C. 154(b) by 0 days.

(21) Appl. No.: 09/889,823

(22) PCT Filed: Jun. 5, 2000

(86) PCT No.: PCT/GB00/02149
§ 371 (c)(1),
(2), (4) Date: Oct. 15, 2001

(87) PCT Pub. No.: WO00/77479
PCT Pub. Date: Dec. 21, 2000

(30) Foreign Application Priority Data

Jun. 12, 2000 (GB) .............................................. 9913615

(51) Int. Cl.[7] .................................................. G01F 3/00
(52) U.S. Cl. ........................................ 378/113; 378/119
(58) Field of Search ................................ 378/113, 119, 378/65, 205; 250/385.1; 313/361.1; 315/5.14, 505

(56) References Cited

U.S. PATENT DOCUMENTS

| | | | | |
|---|---|---|---|---|
| 3,496,463 A | * | 2/1970 | Johnston et al. | 250/336.1 |
| 3,955,089 A | * | 5/1976 | McIntyre et al. | 378/113 |
| 4,206,355 A | * | 6/1980 | Boux | 250/385.1 |
| 4,748,650 A | * | 5/1988 | Ammann | 378/113 |
| 4,803,368 A | * | 2/1989 | Barthelmes | 250/385.1 |
| 5,332,908 A | * | 7/1994 | Weidlich | 378/65 |
| 5,659,228 A | * | 8/1997 | Ueda | 315/505 |
| 5,811,944 A | * | 9/1998 | Sampayan et al. | 315/505 |

* cited by examiner

*Primary Examiner*—Drew A. Dunn
(74) *Attorney, Agent, or Firm*—Lee, Mann, Smith, McWilliams, Sweeney & Ohlson

(57) ABSTRACT

An X-ray beam position monitor has a first plate assembly (1, 3) for detecting the position of the X-ray beam in a horizontal plane and a second plate assembly (6, 8) for detecting the position of the X-ray beam in a vertical plane. The first plate assembly (1, 3) and the second plate assembly (6, 8) are located at the same position along the direction of propagation of the X-ray beam, to provide a compact arrangement suitable for use with X-ray diffractors and for laboratory use.

6 Claims, 4 Drawing Sheets

X-RAY BEAM POSITION MONITORS

BACKGROUND—FIELD OF THE INVENTION

This invention relates to X-ray beam position monitors.

BACKGROUND—PRIOR ART

X-ray diffractometers and cameras, especially those intended for macromolecular crystallography, are relatively large and heavy. The problem of aligning such instruments to the X-ray beam from a rotating anode generator requires very sturdy yet precise translational adjustments. Recently, compact sealed micro-focus X-ray tubes have been developed with a magnetically focused and steered electron beam (Arndt, Long & Duncumb, 1998). These tubes make it possible to keep the diffractometer stationary and to move the X-ray beam into alignment. In most of our applications the tube is used with focusing mirrors (Arndt et al., 1998) which are first aligned with respect to the tube; this alignment can be carried out with small and compact translations or, indeed, can be effected entirely by magnetically deflecting the electron beam on the X-ray tube target. The assembly of tube and collimators can then be moved into position relative to the diffractometer by relatively light translational adjustments. In those applications where pin-hole collimation without focusing mirrors is used, mechanical movements can be dispensed with entirely and the X-ray beam moved using the magnetic deflection of the focal spot on the tube target only.

In both applications alignment is greatly helped by an X-ray beam position monitor, preferably by one which has an electrical output which can be used for controlling the translations so as to make alignment automatic. We have found the split ion chamber (Koyama, Sasaki & Ishikawa, 1989; Schildkamp & Pradervand, 1995; Billing, 1998) ideal for our purposes. Beam-position monitors such as split-plate ion chambers are commonly employed in synchrotron radiation beam lines (Alkire, Rosenbaum & Evans, 1999). However, for laboratory sources and diffractometers compactness is of paramount importance and we have constructed a chamber which allows position monitoring in two orthogonal planes.

BRIEF SUMMARY OF THE INVENTION

According to the invention an X-ray beam position monitor comprises a first plate assembly for detecting the position of the X-ray beam in one plane, the first plate assembly comprising a first pair of collection plates and a first biasing plate, a second plate assembly for detecting the position of the X-ray beam in another plane transverse to said one plane, the second plate assembly comprising a second pair of collection plates and a second biasing plate, switching means for applying a bias voltage to the first biasing plate or the second biasing plate and signal processing means for processing electrical signals which are generated at the collection plates and which are representative of the position of the X-ray beam, wherein the first plate assembly and the second plate assembly are positioned at the same, or substantially the same, axial position along the direction of propagation of the X-ray beam. The placement of the first plate assembly and the second plate assembly at substantially the same position along the direction of propagation of the X-ray beam provides a compact arrangement which renders the monitor particularly useful for use with X-ray diffractometers and for laboratory use generally. This contrasts with the arrangements disclosed in Schildkamp & Pradervand where the X-ray beam passes first between a first plate assembly and then, afterwards, between a second plate assembly.

The plates of the first assembly are preferably orthogonal to the plates of the second assembly, so that said one plane and said another plane are mutually orthogonal. In this case, the first and second plate assemblies preferably constitute the four walls of a square-section tunnel-like structure through which the X-ray beam is propagated.

The X-ray beam position sensor preferably acts as a null-seeking device, the beam being centred by means of successive adjustments in the two planes of positioning, until the electrical signals are representative of a centred position of the X-ray beam.

An X-ray beam position sensor according to the invention will now be described, by way of example, with reference to the accompanying drawings, in which:

DETAILED DESCRIPTION OF THE INVENTION

Figure 1:
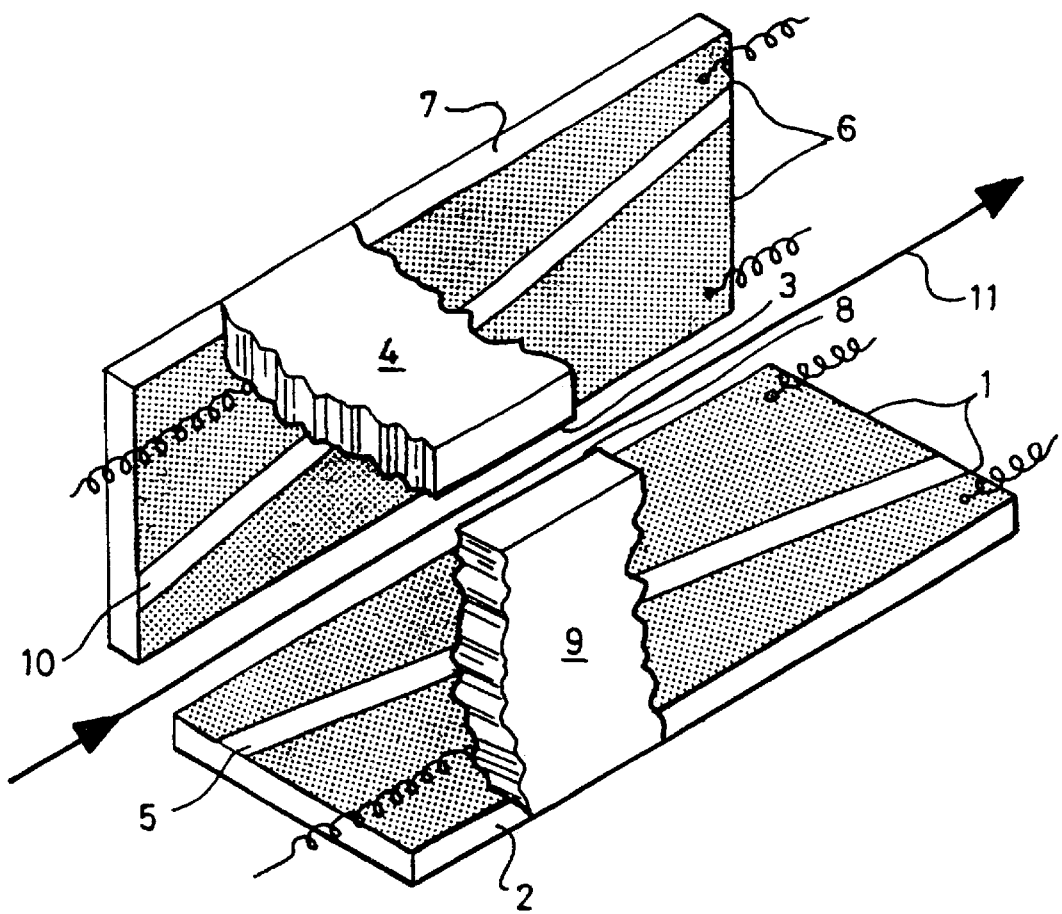
FIG. 1 is a view showing the structure of collection and bias plates in the sensor.
Figure 2:
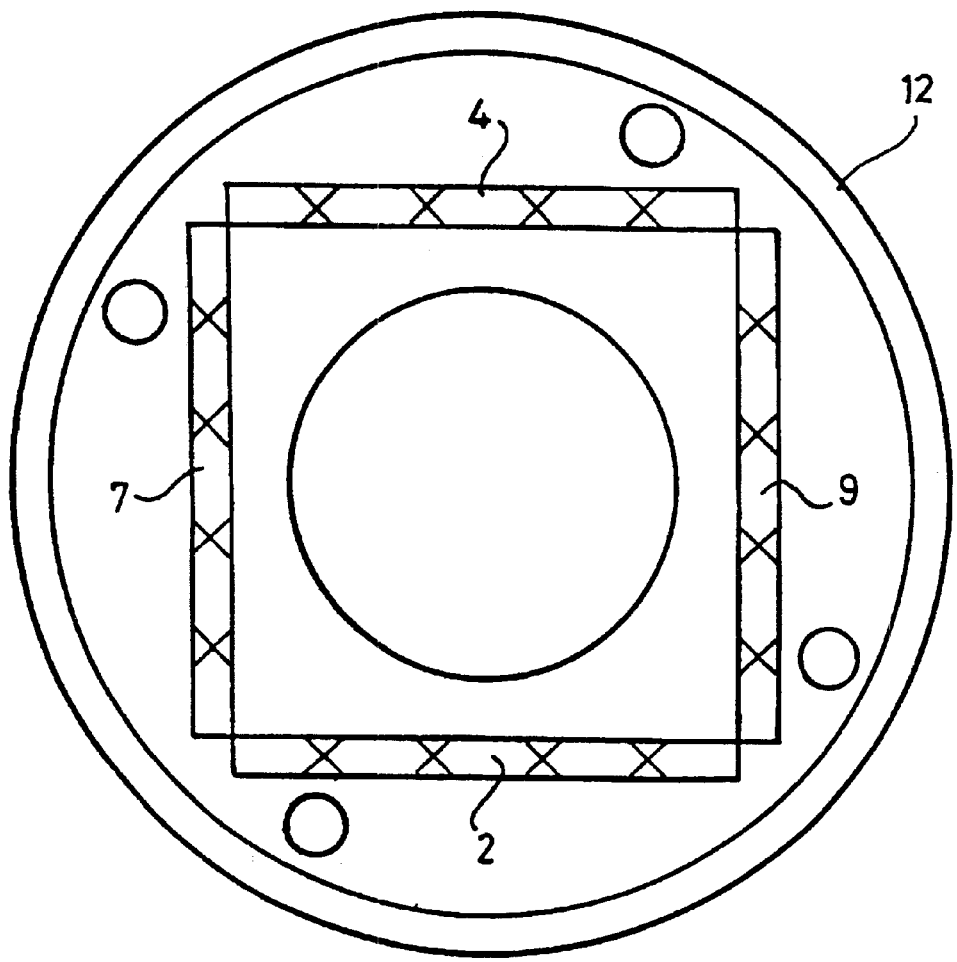
FIG. 2 is an end view of the structure of FIG. 1, shown mounted in a tube.

Referring to FIGS. 1 and 2, the sensor comprises a first plate assembly comprising a first pair of collection plates 1 printed on a first anode board 2, and a first biasing plate 3 printed on a first cathode board 4. The anode and cathode boards 2 and 4 occupy vertically spaced horizontal planes, with the first pair of collection plates 1 facing the first biasing plate 3. The first biasing plate 3 is rectangular in shape, the two collection plates 1 having a similar rectangular outline which is divided along a non-conducting diagonal 5 to form the two individual collection plates 1, each substantially triangular in shape.

Similarly, the second plate assembly comprises a second pair of collection plates 6 printed on a second anode board 7 and a second biasing plate 8 printed on a second cathode board 9. The anode and cathode boards 7 and 9 occupy horizontally spaced vertical planes, with the second pair of collection plates 6 facing the second biasing plate 8. The second biasing plate 8 is rectangular in shape, the two collection plates 6 having a similar rectangular outline which is divided along a non-conducting diagonal 10 to form the two individual collection plates 6, each substantially triangular in shape.

Each plate 1, 3, 6, 8 constitutes an electrode and is formed by an area of copper deposited on the appropriate board.

The first and second plate assemblies thus form a tunnel-like structure of square cross-sectional shape, through which the X-ray beam is propagated. Hence, the first and second plate assemblies are positioned at the same axial position along the direction of propagation of the X-ray beam, the centred direction of which is indicated at 11 in FIG. 1.

The square section tunnel structure is housed within a tube 12, shown diagrammatically in FIG. 2. In a preferred embodiment, each board 2, 4, 7, 9 is a rectangle 12 mm wide by 35 mm long, the tunnel-like structure is 35 mm long and has a square cross-sectional shape with an edge dimension of 14 mm. This structure fits within a 25 mm diameter tube 12, thus providing a compact arrangement.

The two cathode or biasing plates 3 and 8 are connected to a double-pole switch 13, in one position of which (illustrated in FIG. 3) the plate 8 is grounded and the plate 3 is connected to a −300 volt source 14, and in the other position of which the plate 8 is connected to the −300 volt source 14 and the plate 3 is grounded.

The two collection plates 1 are respectively connected to two current-to-voltage amplifiers 15 each having a feedback resistor 16 of 20 GΩ. The amplifiers have respective voltage outputs $V_R$ and $V_L$. In a corresponding manner, the two collection plates 6 are respectively connected to two current-to-voltage amplifiers 17 each having a feedback resistor 18 of 20 GΩ. The amplifiers 17 have respective voltage outputs $V_T$ and $V_B$.

Figure 3:
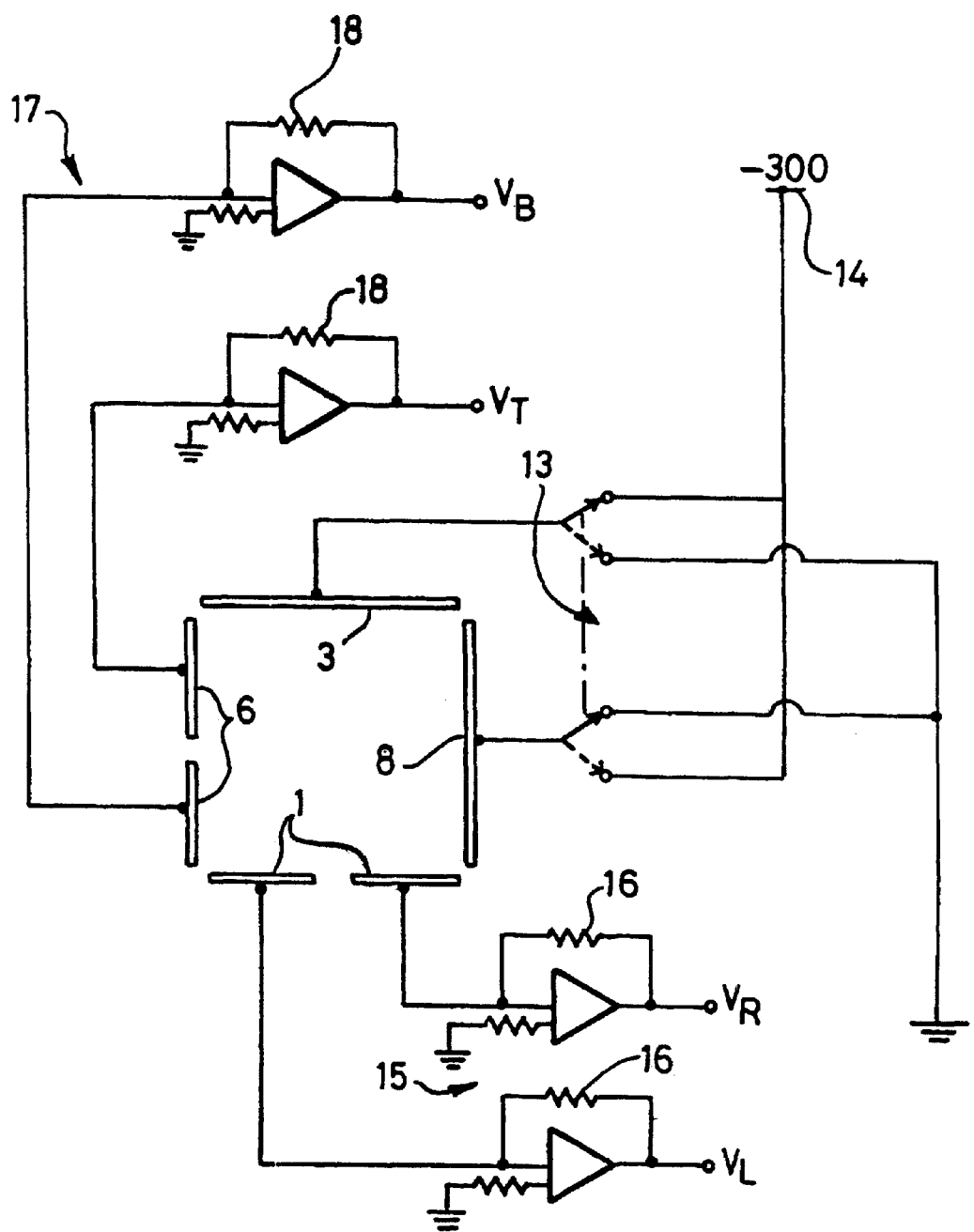
FIG. 3 shows the electrical circuitry of the sensor.

With the switch 13 in the position illustrated in FIG. 3, the horizontal position of the X-ray beam within the sensor is represented by a first differential voltage ratio:

$$\frac{V_R - V_L}{V_R + V_L}$$

With the switch 13 in the alternative position, the vertical position of the X-ray beam within the sensor is represented by a second differential voltage ratio:

$$\frac{V_T - V_B}{V_T + V_B}$$

The beam is positioned so as to be maintained in its central position, the centring of the beam being carried out by successive adjustments in the vertical and horizontal planes until both differential voltage ratios are zero. This centring process may be carried out automatically by a central processing unit.

Figure 4:
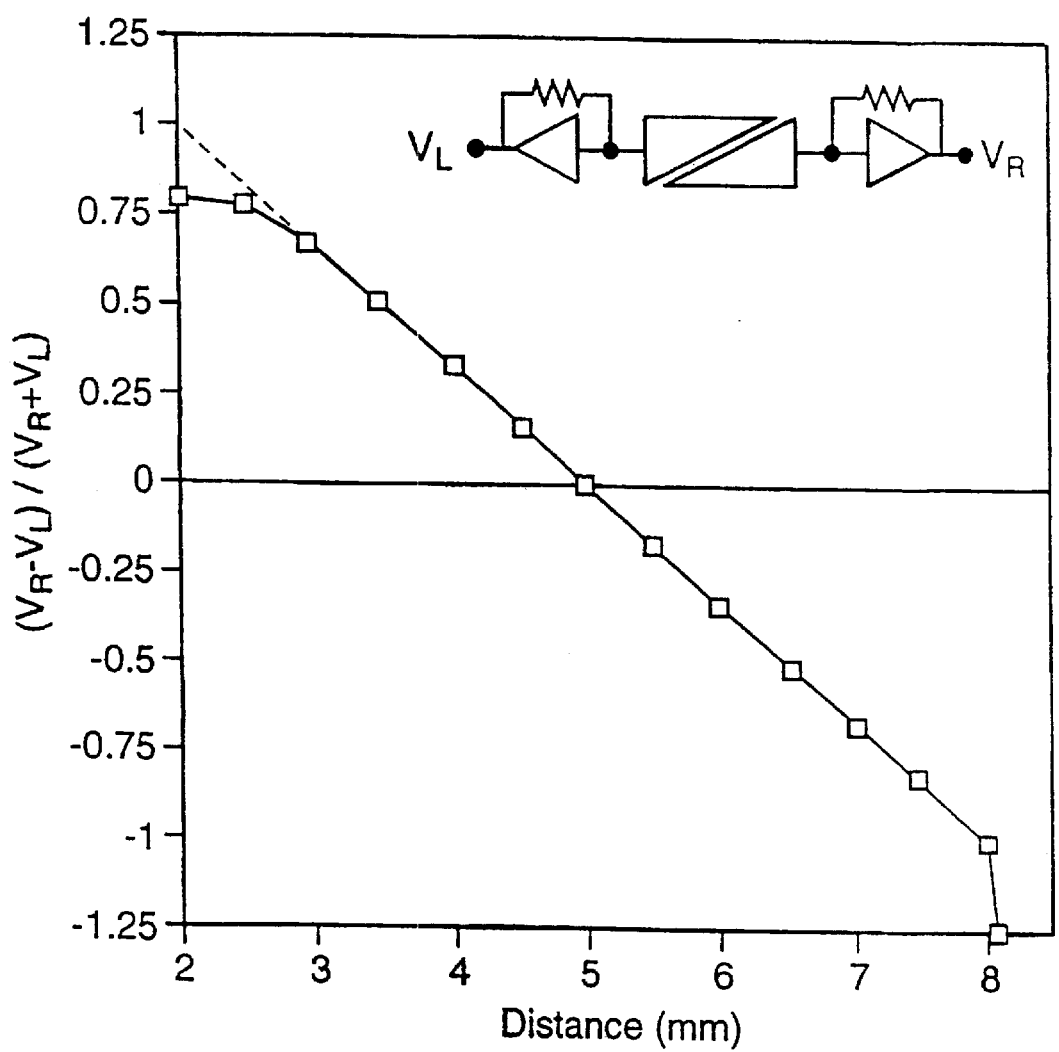
FIG. 4 is a graph showing how an observed output signal varies with displacement of the X-ray beam.

FIG. 4 is a plot showing how the first differential voltage ratio varies with horizontal displacement of the X-ray beam from a central position, represented by 5 mm along the horizontal axis.

The first differential voltage ratio should theoretically vary from −1 through zero to +1. FIG. 4 shows that, except for a small end effect, the ratio behaves in this way in practice. The linear range of the ratio is about 5 mm and the precision about 5 μm. The intensity of the X-ray beam is about $2.5 \times 10^9$ 8 KeV photons $mm^{-2}s^{-1}$; the beam diameter is 0.3 mm. One photon generates ~30 ion-electron pairs in air and with a field of about 300 volt $cm^{-1}$ there is a negligible recombination so that there is a long range of intensities over which the output is linear. The fraction of the beam absorbed in the sensitive volume of the chamber is about 0.06. Accordingly the value of $(V_R+V_L)=(V_T+V_B)$ is about 1 volt so that the signal-to-noise ratio of the device is good.

It will be appreciated from considerations of symmetry, that the second differential voltage ratio varies with beam displacement in a vertical plane, in a similar way to that in which the first differential voltage ratio varies with beam displacement in a horizontal plane.

REFERENCES

Alkire, R. W., Rosenbaum, G & Evans, G. In preparation.

Arndt, U. W., Duncumb, P., Long, J. V. P., Pina, L. & Inneman, A. (1998). *J. Appl. Cryst.* 31, 733–741.

Arndt, U. W., Long, J. V. P. & Duncumb, P. (1998). *J. Appl. Cryst.* 31, 936–944.

Billing, M. (1998), *Nucl. Instrum. Meth. Phys. Res.* A266, 144–149.

Koyama, A., Sasaki, S. & Ishikawa, T. (1989). *Rev. Sci. Instrum.* 60, 1953–1956.

Schildkamp, W. & Pradervand, C. (1995). *Rev. Sci. Instrum.* 66, 1956–1959.

What is claimed is:

1. An X-ray beam position monitor comprising a first plate assembly for detecting the position of the X-ray beam in one plane, the first plate assembly comprising a first pair of collection plates and a first biasing plate, a second plate assembly for detecting the position of the X-ray beam in another plane transverse to said one plane, the second plate assembly comprising a second pair of collection plates and a second biasing plate, switching means for applying a bias voltage to the first biasing plate or the second biasing plate and signal processing means for processing electrical signals which are generated at the collection plates and which are representative of the position of the X-ray beam, wherein the first plate assembly and the second plate assembly are positioned at the same, or substantially the same, axial position along the direction of propagation of the X-ray beam.

2. An X-ray beam position monitor according to claim 1, wherein the plates of the first assembly are orthogonal to the plates of the second assembly, so that said one plane and said another plane are mutually orthogonal.

3. An X-ray beam position monitor according to claim 2, wherein the first and second plate assemblies constitute the four walls of a square-section tunnel-like structure through which the X-ray beam is propagated.

4. An X-ray beam position monitor according to claim 1, wherein the beam is centered by means of successive adjustments in the two planes of positioning, until the electrical signals are representative of a centered position of the X-ray beam.

5. An X-ray beam position monitor according to claim 2, wherein the beam is centered by means of successive adjustments in the two planes of positioning, until the electrical signals are representative of a centered position of the X-ray beam.

6. An X-ray beam position monitor according to claim 3, wherein the beam is centered by means of successive adjustments in the two planes of positioning, until the electrical signals are representative of a centered position of the X-ray beam.

* * * * *